Oct. 20, 1931. W. E. OISHEI ET AL 1,828,716
SIGN
Filed March 14, 1929 2 Sheets-Sheet 1
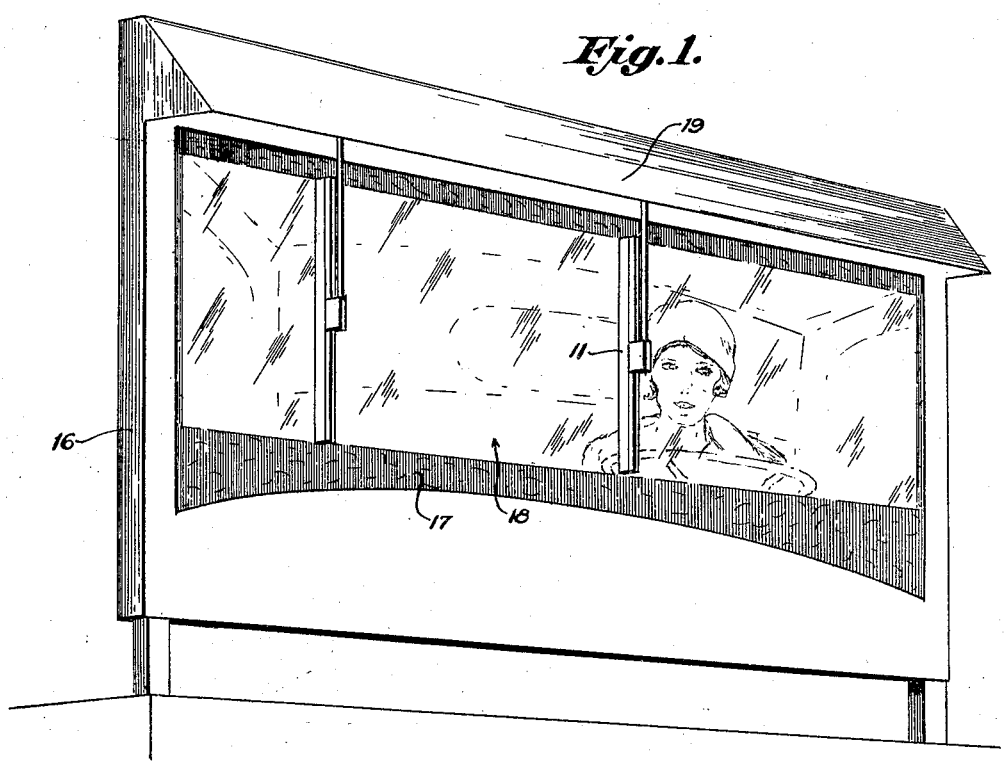
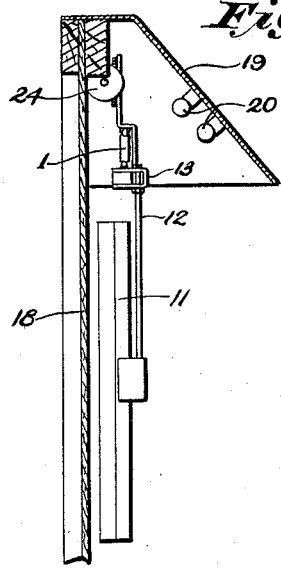

Oct. 20, 1931. W. E. OISHEI ET AL 1,828,716
SIGN
Filed March 14, 1929 2 Sheets-Sheet 2
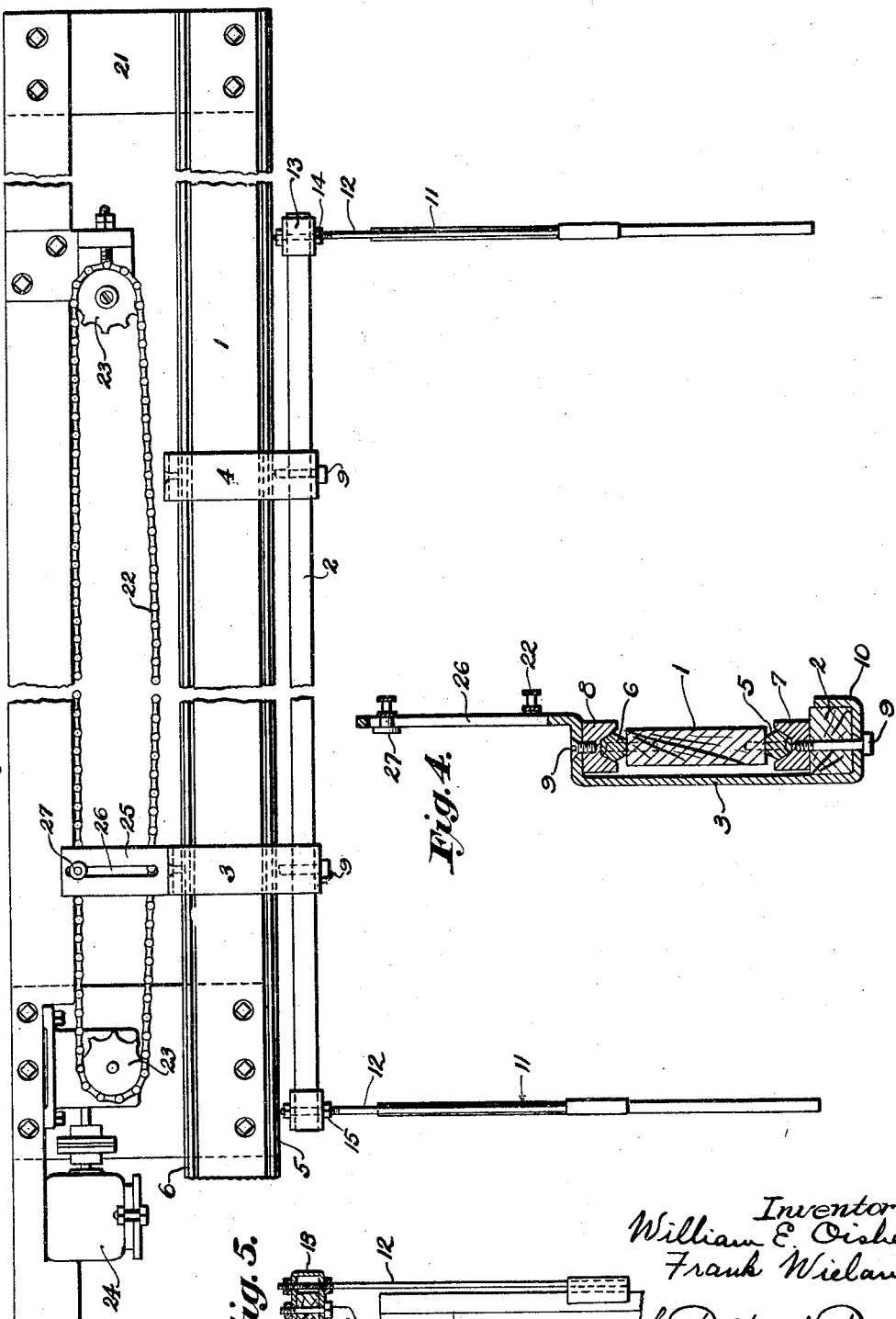

Patented Oct. 20, 1931

1,828,716

UNITED STATES PATENT OFFICE

WILLIAM E. OISHEI AND FRANK WIELAND, OF BUFFALO, NEW YORK, ASSIGNORS TO TRICO PRODUCTS CORPORATION, OF BUFFALO, NEW YORK

SIGN

Application filed March 14, 1929. Serial No. 346,926.

This invention relates to a sign for advertising windshield cleaners and it is primarily directed to an advertising device for displaying the wiper action of windshield cleaners.

Particularly this invention has for its object to provide a simple mechanism for illustrating and teaching the much desired utility and functioning of a dual-wiper windshield cleaner, as, for example, the wiper action of the windshield cleaner disclosed in Patent No. 1,697,358 granted to Henry Hueber January 1, 1929, wherein a pair of companion wipers are mounted to reciprocate in a straight horizontal path of movement for acting conjointly in cleaning substantially the entire width of the windshield.

The invention further has for its object to provide a dummy windshield cleaner simulating in its appearance as well as in its wiper action those attributes and offices of the actual windshield cleaner; and to provide a display sign or advertisement having the appearance of a motor vehicle windshield with an apparently cleaned surface being acted upon by a cleaner, the latter being operable to impart an apparent wiping action over the windshield surface.

The invention is further found to reside in the features of construction and the arrangements and combinations of parts hereinafter described, reference being made to the accompanying drawings wherein, Fig. 1 is a perspective view of the windshield cleaner advertisement or sign constructed in accordance with the present invention.

Fig. 2 is a detailed vertical section therethrough.

Fig. 3 is a fragmentary elevation depicting the mechanical lay-out and operative connections between the power drive and the wiper simulating arms.

Fig. 4 is a vertical section through the carriage and its drive connection.

Fig. 5 is a detail view illustrating more clearly the connection of the wiper-simulating members with the carriage.

Referring more in detail to the accompanying drawings, the numeral 1 designates a trackway or guide for a carriage 2 which is suspended from the trackway by a pair of hangers 3 and 4. These hangers have parts overlying the bottom and upper rails 5 and 6 of the trackway and respectively support shoes 7 and 8 which have sliding contact with the rails, against displacement therefrom. In the particular embodiment the shoes 8 are channeled to receive the rails and are conveniently secured to the hangers, as by screws 9. The hangers are shaped to form stirrup-like parts 10 in which the carriage 2 is seated and adapted to be secured therein by the respective screws 9.

The carriage supports at each end the wiper-simulating members 11 which are shaped to resemble in appearance the wiper blades of a windshield cleaner and are suspended by a rod 12 having adjustable support in a bracket 13, as by the clamp nuts 14 threading on the upper end of the rod and engaging the upper and lower faces of the bracket. These brackets 13 are secured at spaced points on the carriage, as by fastening means 15, so that as the carriage is moved along its trackway 1 the wiper-simulating members 11 will be likewise moved over the sign body, now to be described.

This sign body is finished off to resemble an automobile windshield and has a frame 16 enclosing a portion 17 designed to represent the glass section of the windshield. This portion 17 is provided with an apparently cleaned portion 18 substantially coextensive in length with the path of movement of the wiper-simulating members 11 and indicating, as it were, the area cleaned by the wiper-simulating members. Within this apparently cleaned portion 18 may appear designs indicating the interior of an automobile as it might appear through a windshield, as well as the driver or other passengers of the vehicle, whereby a naturalistic appearance is given to the sign board.

A hood or canopy 19 is arranged along the upper or top edge of the sign board to simulate the visor of an automobile, and this hood is further taken advantage of to function in the capacity of a container for a source of light, indicated at 20, for illumination purposes.

The trackway 1 is mounted by a bracket structure 21 so as to preferably space the trackway 1 from the body of the sign board, and the wiper-simulating members 11 are likewise supported spaced from the body of the sign board so as to operate out of contact therewith, as indicated more clearly in Fig. 2, so that while the wiper-simulating members are reciprocated back and forth across the apparently cleaned section 18 of the glass-simulating part 17, said members 11 do not have any wiping or physical contact with the sign board. Thus, there is obtained an action simulating the wiping action of a dual-wiper windshield cleaner which will fully present and display the advantages as well as the operation of a windshield cleaner of this type.

A simple drive for the carriage 2 is illustrated in Fig. 3, the same comprising an endless drive chain 22 taking over sprockets 23, one of which is operatively connected to an electric motor 24 for continuously moving the chain in a given direction. For the purpose of connecting the carriage to the drive chain, one of the hangers is extended upwardly, as indicated at 25, above the upper flight of the chain, and this extension 25 is connected to a link of the chain. To this end, and still carrying out the thought of having simplicity in construction and design, the extension 25 is provided with a vertical slot 26 in which a pin 27, of the chain link, operates.

Referring specifically to Fig. 3, the operation will be substantially as follows:—as the pin 27 moves to the right the carriage 2 will likewise follow and as the link carrying the pin 27 moves about the right hand sprocket 23 said pin 27 will move downwardly in the slot 26 to a position adjacent the lower end of the slot whereupon the pin 27 will pull the carriage toward the left. A reverse pin movement will occur as the pin link travels about the left hand sprocket. Thus, the slot 26 permits of the pin 27 moving upwardly and downwardly as it passes about the sprockets 23 and will provide a positive connection between the chain and the carriage for imparting the desired reciprocatory motion thereto. This power drive is readily concealed beneath the hood 19 and is unobserved by those watching the display.

What is claimed is:

1. An advertising device comprising a sign body, a representation of an automobile windshield having a substantially rectangular cleaned portion bordered by an uncleaned portion provided on a flat surface thereof, a trackway mounted in parallel relation to said flat surface, a carriage slidably mounted on said trackway, a pair of wiper simulating members rigidly mounted on said carriage, said carriage being guided by said trackway to support the wiper simulating members in spaced relation to said surface, and means for imparting movement to said carriage whereby each of the wiper simulating members traverses its respective portion of the cleaned portion so that said portion appears to have been cleaned by said members.

2. A sign for advertising the functioning of windshield cleaners, comprising a flat body having on one surface a representation of a motor vehicle windshield having a glass portion with a cleaned area, a wiper-simulating member, and means for imparting movement to said wiper-simulating member substantially coextensive with the representation of the cleaned area, said wiper-simulating member being spaced from said surface to prevent contact with said representation.

3. A sign for advertising the wiper action of windshield cleaners, comprising a flat body having on one surface a representation of a motor vehicle windshield having a glass portion with a cleaned area thereof, a wiper-simulating member having a path of movement substantially coextensive with the representation of the cleaned area, means for imparting movement to said wiper-simulating member, and a hood for concealing said means and constituting a housing therefor, said hood simulating the visor of a windshield.

4. A sign for advertising the wiper movement of windshield cleaners, comprising a flat body having on one surface a representation of a motor vehicle windshield and having a cleaned area and a surrounding uncleaned area, a wiper-simulating member spaced from said surface, means for imparting movement to said wiper-simulating member over said representation of the cleaned area, a hood concealing said means and simulating the visor of a windshield, and a source of light housed within said hood.

5. A sign for advertising windshield cleaners, comprising a flat body having on one surface a representation of a motor vehicle windshield, a wiper-simulating member, a visor-simulating hood arranged along the upper edge of the body and overhanging said surface, and means arranged beneath said hood for imparting back and forth movement to the wiper-simulating member, said means maintaining said wiper simulating member in spaced relation to said surface.

6. A sign for advertising windshield cleaners, comprising a flat body having on one surface a representation of a motor vehicle windshield having a glass portion with a cleaned area, a wiper-simulating member having a path of movement substantially coextensive with the representation of the cleaned area, a visor-simulating hood arranged along the upper edge of the body and overhanging said surface, a trackway arranged beneath the hood, a carriage supported by the trackway for movement therealong and carrying said wiper-simulating member in spaced relation to said surface, and means for moving said carriage along its trackway.

7. A sign for advertising windshield cleaners, comprising a flat body having on one surface a representation of a motor vehicle windshield having a glass portion with a cleaned area, a visor-simulating hood arranged along the upper edge of the body and overhanging said surface, a trackway arranged beneath the hood, a carriage supported by the trackway for movement therealong, a wiper-simulating member carried by the carriage and having a path of movement substantially coextensive with the representation of the cleaned area in spaced relation thereto, an endless chain arranged adjacent the trackway, means for driving the chain continuously in one direction, and means operatively connecting the chain to the carriage for converting the continuous motion of the chain into a carriage reciprocating motion.

8. A sign for advertising windshield cleaners, comprising a flat body having on one surface a representation of a motor vehicle windshield having a glass portion with a cleaned area, a wiper-simulating member having a path of movement substantially coextensive with the representation of the cleaned area, a visor-simulating hood arranged along the upper edge of the body and overhanging the apparent cleaned area, a carriage supported beneath the hood for movement and carrying said wiper-simulating member in spaced relation to said surface, an endless chain arranged adjacent the trackway, means for driving the chain continuously in one direction, and means operatively connecting the chain to the carriage, including a bracket arm on the carriage, and a drive part carried by the chain and slidably connected to said bracket arm.

9. An advertising device comprising a sign body, a flat surface on said sign body having a scene thereon representing an automobile windshield having a cleaned portion bordered by an uncleaned portion, a depending member having a rigid wiper blade simulating portion overhanging said surface and slightly spaced therefrom, and means for moving said member over said clean portion of said scene to simulate a wiper in operation.

WILLIAM E. OISHEI.
FRANK WIELAND.